Jan. 12, 1960 A. E. JOHNSON 2,921,243

CURRENT RECTIFIERS

Filed Sept. 13, 1957 2 Sheets-Sheet 1

INVENTOR.
ARTHUR E. JOHNSON
BY
Andrus, Sceales + Starke
ATTORNEYS

INVENTOR.
ARTHUR E. JOHNSON
BY
Andrus, Sceales + Starke
ATTORNEYS

United States Patent Office 2,921,243

Patented Jan. 12, 1960

2,921,243

CURRENT RECTIFIERS

Arthur E. Johnson, Elkhorn, Wis., assignor to A. O. Smith Corporation, Milwaukee, Wis., a corporation of New York Application September 13, 1957, Serial No. 683,784

6 Claims. (Cl. 317—234)

This invention relates to current rectifiers employing solid state rectifying elements which are connected in parallel circuit with each other.

The current carrying capacity of solid state rectifying elements and the like is limited. If a higher than rated current is established, the rectifying element is destroyed. Although similar solid state rectifying elements with the same rated capacity have substantially the same resistance, noticeable differences in resistance may be present due to manufacturing tolerances and economics. When a plurality of the rectifying elements are connected in parallel, the current tends to concentrate in the lowest resistant path. If one parallel path is destroyed, the current normally carried thereby flows in the other parallel paths which are then overloaded and rapidly destroyed. Therefore, a resistor is advisably connected in series with certain of each individual element when they are connected in parallel to maintain an equal resistance and consequently an equal current distribution between them.

Generally, the resistance of a conventional resistor changes with the temperature thereof. Normally, however, the current range is such that the change in temperature and therefore in the resistance of the elements is inconsequential and any conventional resistor is satisfactorily employed in balancing the current distribution regardless of the rated current.

In low-voltage, high-amperage devices, the permissible difference in the impedance between the parallel paths is relatively small before a substantial difference in the current distribution through the different parallel paths is obtained. In large amperage units, having a relatively wide output range, the resistance element which is inserted in the circuit normally changes its resistance quite substantially with temperature. Consequently, even though the parallel paths are balanced at one particular current setting, they may become unbalanced at some other current setting to a state where one or more of the elements will be destroyed due to the resistance change alone of the inserted resistors or in combination with the change in the reactance.

Germanium solid state rectifying elements which are connected in parallel with each other are particularly suited for low-voltage, high-amperage rectifying circuits. The rectifying elements are generally disposed within a cylindrical housing with the contacts on the axial surfaces thereof. The elements are clamped between a pair of conducting straps which serve as the terminals for the rectifier elements. However, it is then difficult to connect a conventional resistance element in series with certain of the rectifier cells to maintain a balanced resistance between the cells and a resultant balanced current distribution.

If a substantial number of paralleled cells are employed between a pair of straps, the current path to and from each cell is different and certain paths enclose or encircle more of the cells than other paths. A distributed reactance drop is established in the straps and the parallel paths which create appreciable unbalance of impedance for the parallel paths and resultant unbalance of current. Further, in rectifying a plurality of alternating currents such as a three phase alternating current, with interconnected rectifiers each having a plurality of paralleled rectifying elements, the interlinkage of magnetic flux from one rectifier to the other may also noticeably unbalance the impedance of each of the rectifying paths.

The present invention provides a plurality of germanium rectifier cells which are clamped or otherwise secured between a pair of conducting members in parallel relation with each other. A washer of Nichrome, Nichrome alloy or the like is inserted in series electrically and physically with certain of the rectifying cells and clamped between the conducting members and the associated cell. The Nichrome type washers insert resistance which effectively maintain an equal current distribution between the individual paralleled cells.

Nichrome or similar material is employed in the washers because the resistance thereof is essentially unaffected by temperature changes in the metal. Further, where rectifiers having different capacities are made, a washer of Nichrome, Nichrome alloy and the like may be employed for all units without calibration for temperature variations between the various rated rectifiers.

The distributed reactive drop is dependent on the current flow through the elements and therefore the total unbalance due to resistance and reactance varies slightly with the current flow. The rectifying paths are therefore preferably balanced for rated current. A slight unbalance at less than rated current is then permissible because one individual cell can then carry a slightly greater current without exceeding its rated capacity. The unbalance is sufficiently minute because the resistance of the paths does not change with the current.

The present invention provides rectifying apparatus particularly adapted for low-voltage, high-current output.

The drawings furnished herewith illustrate the best mode presently contemplated by the inventor for carrying out the invention.

Figure 1:
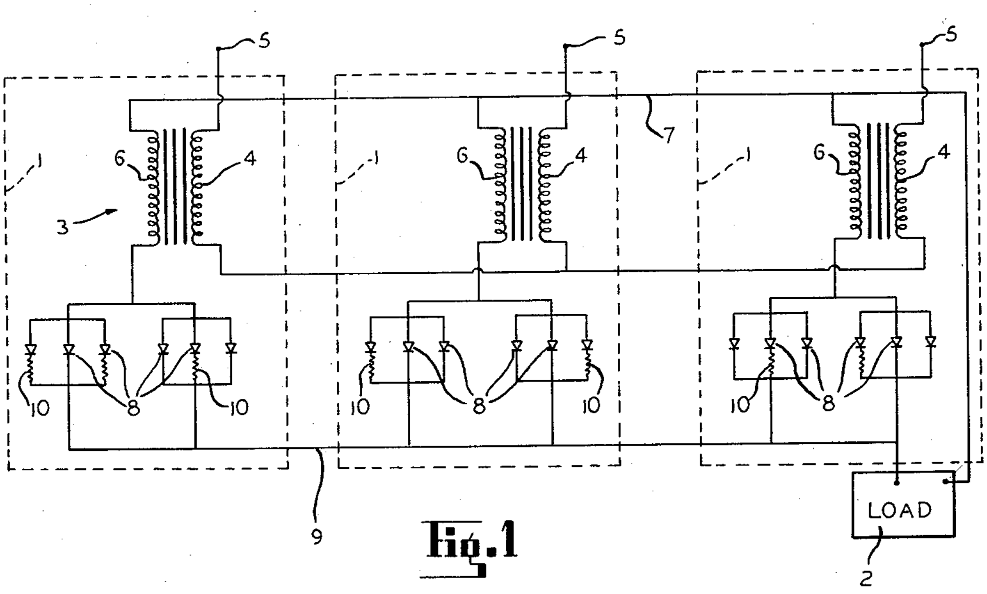
Figure 1 is a circuit diagram of a three-phase, Y-connected rectifying apparatus.

Referring to the drawing and particularly Fig. 1 thereof, a three phase rectifying circuit is shown including three rectifying legs 1 each adapted to rectify one phase of a three phase input and connected in parallel across a load 2 to supply a direct current, hereinafter referred to as a D.C. current, thereto. The rectifying circuit includes a three phase transformer 3 having three primary coils 4 connected in Y with one common terminal or side. The opposite side of each of the coils 4 is connected one each to each of three terminals 5 adapted to be connected to a three-phase alternating current source, not shown. Three secondary coils 6 of the transformer 3 are also connected in a Y connection and are magnetically coupled one to each of the primary coils. The secondary coils 6 are arranged one each in each rectifying leg 1 and are connected on one side thereof by a common terminal or line 7 to the load 2. The opposite side of each secondary coil 6 is connected to the input of paralleled solid state rectifiers 8 disposed in two separate parallel banks. The output from the rectifiers 8 in each leg 1 is connected to a common line 9 which is connected to the opposite side of the load 2. Balancing resistors 10 are serially connected between certain of the individual rectifiers 8 and the common output line 9 to establish the same total resistance in each parallel rectifying circuit.

The alternating current established in the secondary coils 6 during alternate half-cycles of the input current flows serially through the rectifier 8, and series connected resistors 10 if present, and then through the load 2. Due to the three phase connection, a substantially constant D.C. current flows through the load 2, in the conventional manner. By suitably selecting the balancing resistors 10, the current flow through the parallel rectifiers 8 in each branch 1 is maintained essentially equal.

Figure 2:
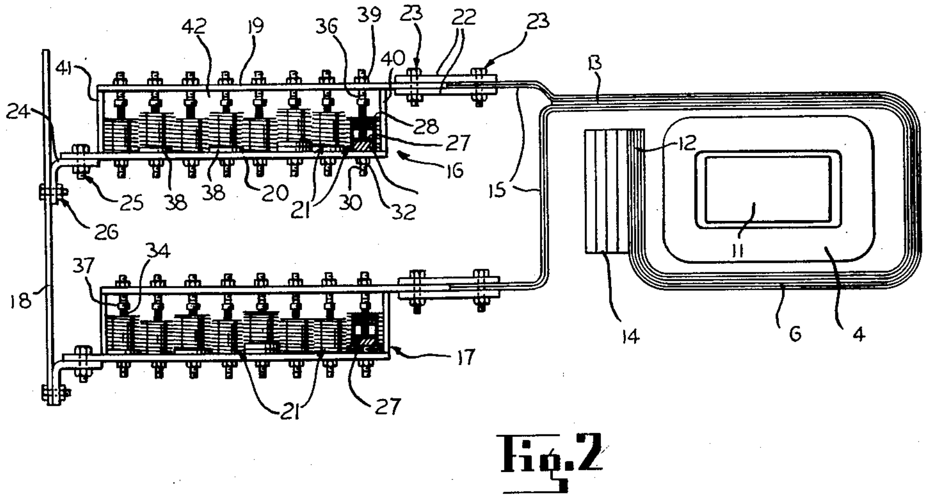
Fig. 2 is an elevation view, more or less diagrammatic, of one leg of the three phase circuit shown in Fig. 1 in accordance with a preferred embodiment of the invention.
Figures 3, 4:
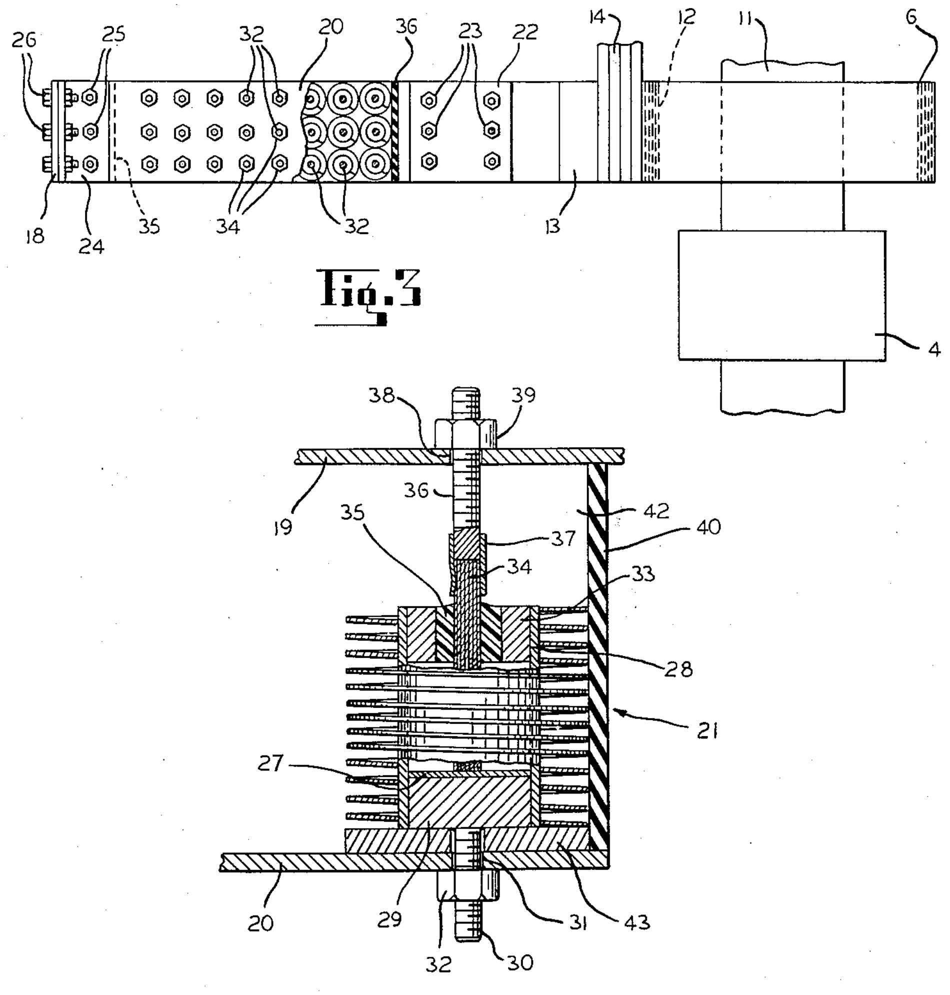
Fig. 3 is a front elevational view of Fig. 2.
Fig. 4 is an enlarged fragmentary view of Fig. 1 with parts broken away to more clearly illustrate a rectifying element.

Referring particularly to Figs. 2–4, a preferred embodiment of one branch 1 of Fig. 1 is shown. The other branches would be formed in the same manner. The apparatus shown is adapted to provide a low-voltage, high-current output. For example, a 0 to 30,000 ampere at 1½ volts unit, generally made in accordance with the structure illustrated, has been placed in commercial use.

Referring to Fig. 2, a magnetic core 11 carries the secondary coil 6 and primary coil 4 of one branch 1 of the circuit to magnetically couple the coils. The illustrated secondary coil comprises four strap-like conductors secured together in any suitable manner and wound into a generally rectangular configuration with the ends 12 and 13 maintained in spaced relation to form a single conducting path. The adjacent ends 12 and 13 serve as the terminals of the coil.

Each primary coil 4 is adapted to be completely disposed within the inner periphery of the secondary coil 6 when close coupling therebetween is desired. The primary coil 4 is disposed on any suitable support, not shown, to allow longitudinal movement of the primary coil on the magnetic core 11 with respect to the secondary coil in order to vary the coupling therebetween and thereby adjust the power output from the secondary coil 6.

A laminated connecting strap 14 is secured to the terminal end 12 of the secondary coil 6 and is connected to a bus bar, not shown, which corresponds to the common load line 7 of Fig. 1 and which is adapted to have the corresponding connector bars of the other two branches of the rectifying apparatus connected thereto.

The terminal end 13 of the secondary coil 6 is divided into two pairs of straps to establish a pair of secondary terminals 15 which are connected one each to one side of a pair of banks of germanium rectifier cells 16 and 17 corresponding to the rectifiers 8 of Fig. 1. The outputs of the parallel banks 16 and 17 are connected to a common copper conductor 18 which is connected to a bus bar, not shown, which corresponds to the common load line 9 of Fig. 1. The banks of rectifier cells in the other branches of the rectifying circuit are also connected to the conductor 18 and thus to the corresponding bus bar.

Each bank of the rectifying cells 16 and 17 includes a pair of parallel, spaced copper straps 19 and 20 having a plurality of cylindrical germanium rectifying cells 21 secured in electrical connection therebetween. The germanium rectifier cells 21 are similarly polarized with respect to straps 19 and 20 to provide parallel paths for conduction of current therebetween in only one direction, for example, from copper strap 19 to copper strap 20.

The terminal straps 19 and 20 project longitudinally in opposite directions beyond the plurality of individual cells clamped therebetween. The end of strap 19 is aligned with terminal 15 and is connected thereto by a pair of metal gripping strips 22 disposed on opposite sides of the aligned strap and terminal. Cooperating nuts and bolt assemblies 23 pass through aligned openings in the strips 22 and the strap 19 and cooperating terminal 15 to rigidly connect the latter in circuit connection. An L-shaped connector 24 is connected to the projecting strap 20 by a bolt and nut assembly 25 and to the conductor 18 by a bolt and nut assembly 26.

Referring particularly to Fig. 4, each germanium rectifying cell 21 includes a flat disc-like germanium rectifying element 27, shown substantially enlarged for purposes of illustration. Each element 27 is disposed within a finned tubular metal housing 28 which has a high heat transfer characteristic to allow rapid dissipation of the heat generated therein. Suitable forced cooling means, not shown, may also be employed.

The metal housing 28 is sealed at one end by a copper slug 29 to which the adjacent surface of the rectifying element 27 is soldered to establish an electrical connection therebetween. A threaded stud 30 is secured to copper slug 29 and extends outwardly therefrom and through an opening 31 in the strap 20. A correspondingly threaded nut 32 is threaded onto the stud 31 to clamp the copper slug 29 adjacent strap 20.

The opposite end of the housing 28 is also sealed by a copper slug 33 in axially spaced relation to the element 27. Suitable insulating and protective elements, not shown, are disposed between the copper slug 33 and the element 27 and fill the space therebetween. The slug 33 is centrally apertured to accommodate a connecting cable 34 extending therethrough. A potted material 35 seals the opening in the slug 33 about the cable 34. The cable 34 is soldered at one end to the opposite surface or terminal of element 27 and is clamped at the opposite end to a threaded stud 36 by a clamp 37.

The stud 36 extends outwardly through an opening 38 in strap 19 which opening is aligned with an opening 31 in strap 20. A nut 39 is threaded onto the stud 36 to support said rectifying cell between the copper straps 19 and 20 and to electrically connect the strap 19 to one terminal surface of the rectifying element 21.

Insulating spacing walls 40 and 41 are disposed adjacent the ends of the row of rectifying cells and clamped between the straps 19 and 20 when nuts 32 and 38 are drawn up to maintain a spacing between the copper straps somewhat greater than the axial length of each individual rectifying cell. This maintains an air passage 42 between the aligned ends of the cells 21 and the copper strap 19 for cooling air or the like.

Nichrome washers 43 are disposed between certain of the individual rectifying cells 21 and the adjacent copper strap 20 with the conducting studs 30 passing therethrough. The studs 36 are longer than studs 30 by a length equal to the space 42 and the rectifying cell 21 is located immediately adjacent the strap 20. The Nichrome washers 43 are securely clamped between the adjacent copper slug 29 of the rectifying cell 21 and the adjacent connecting strap 20 and are effectively connected in series with the element 27. The stud 36 and conductor 34 connect the opposite side of element 27 to the strap 19 to complete the path of each cell.

After an initial assembly of the unit the temperature of each of the germanium rectifier cells 21 is determined.

The forward resistance, that is, in the direction of current flow, of each germanium rectifying element is not necessarily exactly the same as each other element due to necessary manufacturing tolerances and the like. The current flow between the terminal straps concentrator in the lowest resistance path if the elements alone are connected in parallel. The lowest resistance cell would then carry an abnormal current and if the current were sufficiently great, the element would be destroyed.

Further, when the load is drawing current, a distributed reactance drop is established in the rectifying branches 16 and 17. Referring to Fig. 2, the current flow between straps 19 and 20 at the rectifying cells immediately adjacent the bus bar 18 encloses all of the cells whereas the cells immediately adjacent the input terminals 15 enclosed none of the other cells. Similarly, the intermediately disposed cells, proceeding from terminal 15 to the bus bar 18, successively enclose more and more cells. This establishes a distributed reactive drop and effectively makes the last cell or row of cells adjacent bus bar 18 as the lowest impedance path. The current tends to concentrate in this last row of cells.

In low-voltage, high-current units, this is particularly a source of destruction because a small difference in the impedance of the parallel paths results in a substantial difference in the current through the parallel paths for any given voltage. Of course, if one of the parallel paths is destroyed, the other parallel paths have to carry the additional load. This would tend to successively destroy the other parallel path in the order of their relative resistance.

The current distribution due to the reactive component and the differences in resistance between elements 21 results in a different operating temperature of the cells. The resistance of the Nichrome washers is then adjusted to maintain a substantially equal absolute impedance across each parallel path at rated load. This resistance may be readily varied by changing the effective thickness of the washers 43 by employing a different number of washers inserted or by varying the actual thickness of a single washer or both.

Further, although in the operation of the unit, the temperature of the components including the washers 43 may vary, the current distribution between the parallel paths is not disturbed because the resistance of the washers does not change. This is true because the washers are formed of Nichrome, a Nichrome alloy or some similar resistance material having an extremely low temperature co-efficient and therefore having an essentially constant resistance over a wide range of temperature changes.

The present invention provides a simple resistance balancing means for rectifiers, essentially independent of temperature, and which means is particularly adapted for paralleled germanium rectifier elements in low-voltage, high amperage devices. The washers or the like are rapidly and easily connected in the rectifying apparatus to provide a balanced circuit.

Various modes of carrying out the invention are contemplated as being within the scope of the following claims particularly pointing out and distinctly claiming the subject matter which is regarded as the invention.

I claim:

1. A current rectifying device, comprising a plurality of solid state rectifying means having opposite contact surfaces, terminal means adapted to have said means disposed therebetween in parallel circuit connection, resistance elements having a low temperature coefficient disposed between a contact surface of certain of said rectifying means and a terminal means to establish substantially the same impedance in each parallel path, and means to support said resistance elements and said rectifying means in stacked relation between said terminal means with each of said resistance elements having one surface contacting one of said terminal means and an opposite surface contacting the contact surface of a corresponding rectifying means to establish a series circuit.

2. A current rectifying device, comprising a plurality of solid state rectifying means having opposite contact surfaces, terminal means adapted to have said means disposed therebetween in parallel circuit connection, resistance elements having a low temperature coefficient disposed between a contact surface of certain of said rectifying means and a terminal means to establish substantially the same impedance in each parallel path, and means to support said resistance elements and said rectifying means in stacked relation between said terminal means with each of said resistance elements having one surface contacting said terminal means and an opposite surface contacting a contact surface of a cooperating rectifying means to establish a series circuit, the effective thickness of the resistance elements being adjusted to establish an equal resistance in each of said parallel paths.

3. In a current rectifying device, a pair of rod-shaped conductors disposed in spaced side-by-side relation, a plurality of solid state rectifying cells each having opposite terminal surfaces, said cells being disposed between said conducting straps with corresponding terminal surfaces confronting said straps, flat resistance elements disposed in stacked relation between a terminal surface of certain rectifying elements and the adjacent conductor, and rod-like means extending transversely of the conductors and operatively attached to the conductors and the rectifying cells and the resistance elements to secure them in stacked relation and in series connection.

4. In a current rectifying device, a pair of rigid conducting bars mounted in spaced side-by-side relation, and having a plurality of aligned openings, a plurality of cylindrical germanium rectifying cells disposed between said bars and having terminals at the axial ends thereof confronting the adjacent bars to establish a plurality of parallel current paths, rod members extending from said terminals and through said aligned openings, a Nichrome alloy washer disposed upon one of said rod members of certain certifying elements, the effective axial thickness of the washers being selected to establish an equal impedance of each parallel path at rated load, and means operatively associated with each rod member and the cooperating bar to secure the rectifying elements between said bars with said washers clamped between the adjacent terminal and bar to provide an electrical path therebetween.

5. In a current rectifying device, a pair of rigid conducting members stationarily mounted relative each other in spaced side-by-side relation, said conducting members having a plurality of aligned openings, a plurality of germanium rectifying elements having current terminals and being disposed between said conducting members, a housing for each of said elements, each housing having one end sealed by a copper slug and being disposed with said copper slug confronting one of said members, said copper slug being in electrical contact with the terminals of the rectifying element, bolt means extending in from each of said slugs and through an opening in the conducting members, a resistance washer having a low temperature co-efficient of resistance mounted on said bolt means, a securement nut threaded onto said bolt means to secure said rectifying element between said conducting member with said washer clamped between the adjacent copper slug and conducting member to serially connect said germanium rectifying element and said washer to said conducting member, and means to electrically connect the opposite current terminal to the other conducting member.

6. In a current rectifying device, a plurality of cylindrical germanium rectifying elements adapted to conduct current in one axial direction, tubular housings one for each of said elements, said housings each having end closures with the germanium element, one of said end closures constituting a solid copper slug, attachment bolts extending axially in opposite direction one from said copper slug and one from the opposite contact surface of the element, a pair of metal terminal straps disposed in spaced side-by-side relation and having a plurality of aligned openings adapted to receive said oppositely extending bolts to establish a plurality of parallel paths therebetween, insulating spacing members disposed between said straps to maintain a spacing greater than the axial length of the housings, Nichrome alloy washers disposed upon certain of each of said oppositely extending bolts, certain of said washers being of different effective axial thickness to insert a different resistance in certain parallel paths to maintain a constant total absolute impedance in each parallel path, and securement nuts disposed on said bolts and drawn up to clamp said straps together and to position said housing with the Nichrome alloy washers tightly clamped between the adjacent copper end closure and terminal strap.

References Cited in the file of this patent

UNITED STATES PATENTS

| | | |
|---|---|---|
| 2,430,488 | Wilhelm | Nov. 11, 1947 |
| 2,521,687 | Cameron et al. | Sept. 12, 1950 |
| 2,853,636 | Ploen | Sept. 23, 1958 |